US008823988B2

(12) United States Patent
Kim et al.

(10) Patent No.: US 8,823,988 B2
(45) Date of Patent: Sep. 2, 2014

(54) IMAGE FORMING APPARATUS SUPPORTING PEER-TO-PEER CONNECTION AND METHOD OF EXECUTING APPLICATION PROGRAM THEREOF THROUGH INTERNET PROTOCOL ADDRESS LINKAGE

(71) Applicant: Samsung Electronics Co., Ltd., Suwon-si (KR)

(72) Inventors: Byoung-yue Kim, Suwon-si (KR); Jin-hyung Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 94 days.

(21) Appl. No.: 13/682,977

(22) Filed: Nov. 21, 2012

(65) Prior Publication Data

US 2013/0128311 A1    May 23, 2013

(30) Foreign Application Priority Data

Nov. 22, 2011    (KR) .......................... 10-2011-0122394

(51) Int. Cl.
*G06F 3/12*    (2006.01)
*G06F 15/16*   (2006.01)

(52) U.S. Cl.
USPC ....... 358/1.15; 358/1.13; 358/1.14; 358/1.16; 358/1.18; 709/227; 710/303; 710/304

(58) Field of Classification Search
None
See application file for complete search history.

(56) References Cited

U.S. PATENT DOCUMENTS

| 6,496,511 | B1 * | 12/2002 | Wang et al. .................. 370/401 |
| 2003/0156567 | A1 * | 8/2003 | Oak ............................. 370/338 |
| 2010/0069008 | A1 * | 3/2010 | Oshima et al. ............... 455/41.3 |
| 2011/0082939 | A1 | 4/2011 | Montemurro et al. |
| 2011/0225305 | A1 * | 9/2011 | Vedantham et al. .......... 709/227 |
| 2011/0238800 | A1 * | 9/2011 | Ishimoto ....................... 709/221 |
| 2011/0294502 | A1 * | 12/2011 | Oerton ....................... 455/426.1 |
| 2013/0057908 | A1 * | 3/2013 | Park ............................. 358/1.15 |
| 2013/0057912 | A1 * | 3/2013 | Park ............................. 358/1.15 |
| 2013/0158161 | A1 * | 6/2013 | Kim et al. ..................... 523/122 |

OTHER PUBLICATIONS

Extended European Search Report dated Jun. 10, 2013 from European Patent Application No. 12191023.6, 7 pages.
Realtek, "Realtek Wi-Fi Direct Programming Guide", Version 1.1, Jul. 27, 2011, 9 pages.
Kyocera, "Network Scanner Setup Guide", KM-1820, FS-1118MFP, Sep. 2005, 32 pages.

* cited by examiner

*Primary Examiner* — Miya J Cato
(74) *Attorney, Agent, or Firm* — Staas & Halsey LLP

(57) ABSTRACT

An application program may be executed through an Internet protocol (IP) address linkage in an image forming apparatus supporting a peer-to-peer connection. The application program may be executed by performing a method which includes connecting the image forming apparatus to a wireless device through a wireless local area network, driving a soft access point (AP) module of the image forming apparatus so that the image forming apparatus functions as an AP, driving a dynamic host configuration protocol server of the image forming apparatus to allocate a dynamic IP address to the connected wireless device, and linking the dynamic IP address allocated to the wireless device with a static IP address that is preset with respect to the wireless device.

21 Claims, 13 Drawing Sheets

| WIFI DIRECT SUPPORT | DEVICE TYPE | MANUFACTURER | DEVICE NAME | MAC ADDRESS | DYNAMIC IP ADDRESS |
|---|---|---|---|---|---|
| Yes | Computer | Samsung | User1 | 00:00:01:02:03:04 | 192.168.195.100 |
| No | Camera | Vendor1 | Camera1 | 00:00:01:02:03:05 | 192.168.195.101 |

FIG. 13

| ADD | DELETE | EDIT | | ▼ EXPAND ALL | ▲ REDUCE ALL |
|---|---|---|---|---|---|
| ☐ IPv4 ADDRESS RANGE | | | ALLOWABLE SERVICE | | PRIORITY |
| ☑ DYNAMIC IP RULE OF WIFI STATION | | | Raw TCP/IP PRINT, LPR/LPD, HTTP(WEB INTERFACE)1 (TOP PRIORITY) | | |

ALLOWABLE SERVICE : Raw TCP/IP PRINT, LPR/LPD, HTTP(WEB INTERFACE)
NON-ALLOWABLE SERVICE : TRANSMIT FROM FAX TO PC, IPP, SNMP, NETWORK SCAN MANAGER

| ☑ ENTIRE IPv4 ADDRESS (0.0.0.0~255.255.255.255) | | Raw TCP/IP PRINT, LPR/LPD, HTTP(WEB INTERFACE), ...10 (LOWEST PRIORITY) | |

ENTIRE IPv4 ADDRESS : ENTIRE IPv4 ADDRESS (0.0.0.0~255.255.255.255)
ALLOWABLE SERVICE : Raw TCP/IP PRINT, LPR/LPD, HTTP(WEB INTERFACE)
TRANSMIT FROM FAX TO PC, IPP, SNMP, ETWORK SCAN MANAGER
NON-ALLOWABLE SERVICE : NO SERVICE

IMAGE FORMING APPARATUS SUPPORTING PEER-TO-PEER CONNECTION AND METHOD OF EXECUTING APPLICATION PROGRAM THEREOF THROUGH INTERNET PROTOCOL ADDRESS LINKAGE

CROSS-REFERENCE TO RELATED APPLICATIONS

This application claims the priority benefit of Korean Patent Application No. 10-2011-0122394, filed on Nov. 22, 2011, in the Korean Intellectual Property Office, the disclosure of which is incorporated herein in its entirety by reference.

BACKGROUND

1. Field

The present invention relates to an image forming apparatus supporting a peer to peer (P2P) connection, and more particularly, to a method of executing an application program in linkage with a dynamic Internet protocol (IP) address allocated to a wireless device connected to the image forming apparatus supporting the P2P connection.

2. Description of the Related Art

Recently, peer to peer (P2P) communication technology, by which wireless devices may be directly connected to each other without an additional wireless connecting apparatus, have been generalized and widely used. For example, BLUETOOTH technology may be utilized to perform P2P communication. Although there are limitations in terms of transmission speed and transmission range of BLUETOOTH, new versions of BLUETOOTH are being developed to compensate for the limitations.

Wi-Fi is a wireless local area network (WLAN) standard based on IEEE 802.11 regulated by the Wi-Fi alliance. Wi-Fi is basically a technology using ultra-high speed Internet by accessing access points (APs) connected to an infrastructured network; however, Wi-Fi may be utilized to perform P2P communication by using an ad-hoc function. However, when the ad-hoc function is used, security is weakened, a transmission speed is lowered, and a setting method is not easily performed. Therefore, the Wi-Fi alliance has suggested a Wi-Fi Direct technology which may also be used to perform P2P communication. Wi-Fi Direct allows for a P2P connection between wireless devices without using an AP, supports a transmission speed of a maximum of 250 Mbps, and performs security settings by using Wi-Fi protected access 2 (WPA2), in order to address problems of the ad-hoc function. In addition, Wi-Fi Direct supports a transmission range of a maximum of 200 m, and thus, is considered as a substitute for performing P2P communication in place of Wi-Fi, BLUETOOTH, and the like.

As described above, with the appearance of Wi-Fi Direct, it is considered that utilization of P2P communication will further increase. In addition, P2P communication technology may also be applied to a variety of devices, including image forming apparatuses such as printers, scanners, facsimiles, and multi-function printers. Therefore, technologies for user authentication, controlling connections, controlling rights, and managing security are necessary for safely and conveniently using image forming apparatuses supporting a P2P connection.

SUMMARY

Additional aspects and/or advantages will be set forth in part in the description which follows and, in part, will be apparent from the description, or may be learned by practice of the invention.

The present invention provides a method of executing an application program in linkage with a dynamic Internet protocol (IP) address allocated to a wireless device that is connected to an image forming apparatus supporting a peer-to-peer (P2P) connection.

According to an aspect of the present invention, there is provided a method of executing an application program through an internet protocol (IP) address linkage in an image forming apparatus supporting a peer-to-peer (P2P) connection, the method including: P2P connecting the image forming apparatus to an external wireless device through a wireless local area network (WLAN); driving a soft access point (AP) module of the image forming apparatus so that the image forming apparatus functions as an AP; driving a dynamic host configuration protocol (DHCP) server of the image forming apparatus to allocate a dynamic IP address to the connected wireless device; storing device information of the wireless device including the dynamic IP address allocated to the wireless device and a media access control (MAC) address of the wireless device in a wireless device information list; linking the dynamic IP address allocated to the wireless device with a static IP address that is preset with respect to the wireless device in the application program by using the device information stored in the wireless device information list; and executing the application program.

The image forming apparatus may function as the AP that allows clients on a WLAN to be connected to each other or may function as a client on the WLAN, and the allocating of the dynamic IP address may be performed when the image forming apparatus functions as the AP.

The linking the dynamic IP address with the static IP address preset with respect to the wireless device may include extracting the dynamic IP address corresponding to the MAC address of the wireless device in the wireless device information list and linking the extracted dynamic IP address with the static IP address.

The device information may include one or more selected from a device type, a manufacturer, a device name, and a host name of the wireless device.

The method may further include determining whether the connection to the wireless device is maintained, and when it is determined that the connection to the wireless device is disconnected, deleting the device information of the disconnected wireless device from the wireless device information list.

The method may further include scanning a network port of the wireless device; determining a protocol supported by the wireless device as a result of the scanning; and activating the protocol supported by the wireless device.

According to another aspect of the present invention, there is provided an image forming apparatus supporting a peer-to-peer (P2P) connection, the image forming apparatus including: a communication interface unit to connect to an external wireless device in a P2P connection method when the image forming apparatus performs as an access point (AP) by driving a soft AP module; a communication control unit to allocate a dynamic internet protocol (IP) address to the wireless device connected to the image forming apparatus through the communication interface unit, by driving a dynamic host configuration protocol (DHCP) server; a wireless device information management unit to store device information of the wireless device including the dynamic IP address allocated to the wireless device and a media access control (MAC) address of the wireless device in a wireless device information list; a wireless device information list storage unit to store the wireless device information list; and an application program execution unit to link the dynamic IP address allocated to the wireless device with a static IP address that is preset with respect to the wireless device in the application program by using the device information stored in the wireless device information list and to execute the application program.

The image forming apparatus may function as the AP that allows clients on a WLAN to be connected to each other or may function as a client on the WLAN, and the communication control unit may allocate the dynamic IP address to the connected wireless device when the image forming apparatus functions as the AP.

The application program execution unit may include: a static IP address setting unit to set a static IP address with respect to the wireless device; a static IP address storage unit to store the static IP address; and an IP address linkage unit to link the dynamic IP address allocated to the wireless device with the static IP address by using the device information stored in the wireless device information list.

The IP address linkage unit may extract the dynamic IP address corresponding to the MAC address of the wireless device from the wireless device information list, and may link the dynamic IP address with the static IP address.

The device information received by the communication control unit may include one or more of a device type, a manufacturer, a device name, and a host name of the wireless device.

When the connection of the wireless device is disconnected, the communication control unit may notify the wireless device information management unit of the disconnection and the wireless device information list may delete the device information of the disconnected device from the wireless device information list.

The communication control unit may scan a network port of the wireless device to search for a protocol supported by the wireless device, and may activate the searched protocol.

According to another aspect of the present invention, there is provided an image forming apparatus supporting a peer-to-peer (P2P) connection, the image forming apparatus including: a communication interface unit to connect to an external wireless device in a P2P connection method; a communication control unit to allocate a dynamic internet protocol (IP) address to the wireless device and to determine whether the wireless device supports a predetermined wireless communication type, wherein the communication control unit selectively obtains device information of the wireless device depending on whether the wireless device supports the predetermined wireless communication type; a storage unit to store the obtained device information of the wireless device; and an application program execution unit to link the dynamic IP address allocated to the wireless device with a static IP address that is preset with respect to the wireless device in an application program by using the stored device information, and to execute the application program.

The image forming apparatus may operate as an access point (AP) after performing a negotiation process between the image forming apparatus and the wireless device during connection of the wireless device to the image forming apparatus.

The image forming apparatus may be determined to be an access point by comparing an intent value of the image forming apparatus with an intent value of the wireless device.

The predetermined wireless communication type may include Wi-Fi Direct.

The application program execution unit may include an IP restriction function, to automatically restrict the wireless device allocated the dynamic IP address to a range of services.

BRIEF DESCRIPTION OF THE DRAWINGS

The above and other features and advantages of the present invention will become more apparent by describing in detail exemplary embodiments thereof with reference to the attached drawings in which:

FIG. 13 is a diagram showing a screen for setting an IP limitation function in the multi-function printer supporting the Wi-Fi Direct according to the embodiment of the present invention.

DETAILED DESCRIPTION

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Like numbers refer to like elements throughout.

Expressions such as "at least one of," when preceding a list of elements, modify the entire list of elements and do not modify the individual elements of the list.

Hereinafter, a multi-function printer (MFP) that supports Wi-Fi Direct will be described as an example of an image forming apparatus supporting a peer-to-peer (P2P) connection. However, the scope of the present invention to be protected is not limited thereto, but is defined by descriptions of claims.

Before describing embodiments of the present invention, a basic connections and operations of an MFP that supports the Wi-Fi Direct will be described with reference to accompanying drawings.

Figure 1:
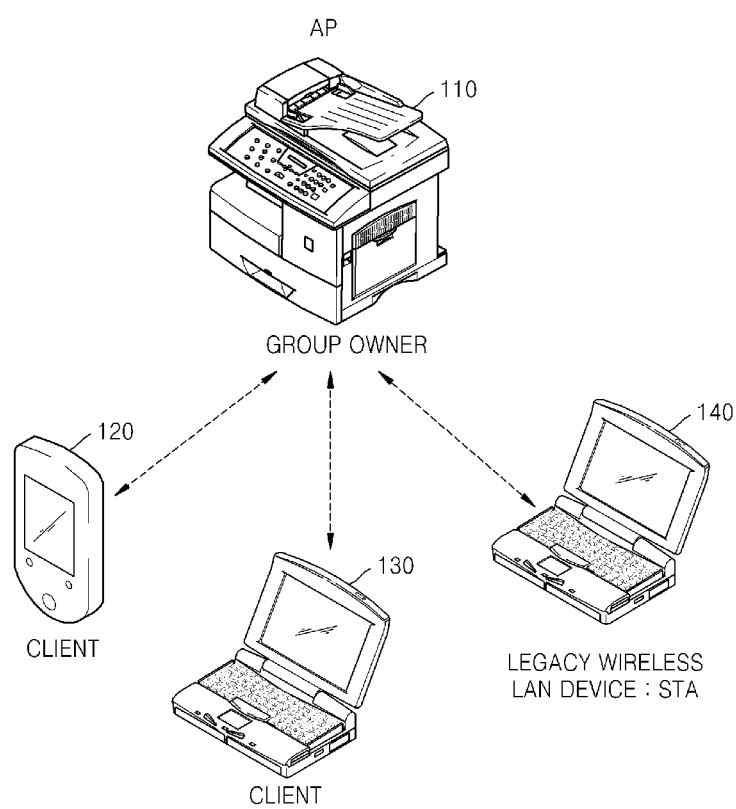
FIG. 1 is a diagram showing devices supporting Wi-Fi Direct and legacy wireless local area network (WLAN) devices that are wirelessly connected to each other to form a wireless network.

FIG. 1 is a diagram showing an example wireless local area network (WLAN), which includes WLAN devices supporting Wi-Fi Direct and a legacy WLAN device connected to each other to form a wireless network. Referring to FIG. 1, an MFP 110 supporting Wi-Fi Direct is wirelessly connected to a mobile device (e.g., a smartphone) 120 supporting Wi-Fi Direct, a laptop computer 130 supporting Wi-Fi Direct, and a legacy WLAN laptop computer 140. Here, the legacy WLAN laptop computer 140 denotes a conventional laptop computer which adopts a WLAN technology and does not support Wi-Fi Direct. Here, it should be noted that mobile device 120, laptop computer 130, and WLAN computer 140 are merely representative devices used for purposes of illustration, and other types of devices which are capable of wireless communication may instead be utilized. Further, the number of wireless devices on the WLAN network according to the present invention is not limited to those shown in FIG. 1.

A WLAN device supporting Wi-Fi Direct (hereinafter, referred to as a "Wi-Fi Direct device") may perform a P2P connection without using an infrastructured network, unlike conventional devices supporting Wi-Fi. In more detail, according to conventional Wi-Fi technology, a Wi-Fi device is wirelessly connected to a router, that is, an access point (AP), which is connected to and forms part of, an infrastructured network that is configured in advance in order to form a wireless network. An infrastructured network may include a router, gateway, or other device which acts as an access point or central hub and devices which are Wi-Fi capable may be connected to the access point. The access point which forms part of the infrastructured network in a conventional Wi-Fi arrangement may be connected by a wired connection to the infrastructured network. Additionally, typical Wi-Fi devices in such an infrastructured network do not communicate directly with one another, but instead communicate via the access point which forms part of the infrastructured network. Here, the Wi-Fi devices, which are wirelessly connected to the AP, function as stations. However, according to Wi-Fi Direct technology, one of the Wi-Fi Direct devices that forms part of the wireless network operates as an AP, and the other Wi-Fi Direct devices are wirelessly connected to the Wi-Fi Direct device that operates as the AP to operate as stations. Therefore, the wireless network may be formed between the Wi-Fi direct devices without using an AP which is connected to and forms part of, the infrastructured network. In addition, when the wireless network is formed between the Wi-Fi direct devices, legacy WLAN devices such as Wi-Fi devices may recognize the Wi-Fi direct device operating as an AP and may be wirelessly connected to the Wi-Fi direct device.

Referring to FIG. 1, the Wi-Fi Direct MFP 110, the Wi-Fi Direct smartphone 120, and the Wi-Fi Direct laptop computer 130 that are the Wi-Fi direct devices form a wireless network without an AP connected to an infrastructured network. As described above, the Wi-Fi direct devices may be wirelessly connected to each other to form a P2P group without an AP connected to the infrastructured network. Here, the Wi-Fi Direct MFP 110 operates as the AP, and the device operating as the AP among the Wi-Fi direct devices is referred to as a group owner (GO) of a P2P group. In addition, the Wi-Fi smartphone 120 and the Wi-Fi Direct laptop computer 130 are wirelessly connected to the GO, that is, the Wi-Fi Direct MFP 110, to operate as the stations, which are referred to as clients. On the other hand, the legacy WLAN laptop computer 140 that does not support the Wi-Fi Direct recognizes the GO, that is, the Wi-Fi Direct MFP 110, as the AP, and is wirelessly connected to the GO to be connected to the wireless network formed by the Wi-Fi direct devices.

In FIG. 1, the Wi-Fi Direct MFP 110 operates as the GO; however, any one of the other Wi-Fi direct devices, that is, the smartphone 120 and the laptop computer 130, may operate as the GO and the MFP 110 may operate as the client. Which of the Wi-Fi direct devices to become the GO is determined through a negotiation process in a Wi-Fi direct connection processes, and this will be described in detail later. Meanwhile, the Wi-Fi direct device may be the GO by itself before the connection without any negotiation, and the Wi-Fi direct device in this case is referred to as an autonomous group owner (AGO). In addition, a wireless network formed based on the AGO is referred to as an autonomous P2P group. When the autonomous P2P group is formed, the legacy WLAN device may recognize the AGO as an AP connected to the infrastructured network and may be connected to the AGO.

Although FIG. 1 shows an example in which the Wi-Fi direct devices form the P2P group without the AP connected to the infrastructured network, the Wi-Fi direct devices may operate as the stations by connecting to the AP, if the AP is connected to the infrastructured network.

Hereinafter, wireless connecting processes between the Wi-Fi direct devices and characteristics of the Wi-Fi Direct technology will be described with reference to the accompanying drawings. For convenience of description, an MFP supporting the Wi-Fi Direct (hereinafter, referred to as "Wi-Fi Direct MFP") will be described as an example; however, the scope of the present invention is not limited thereto, that is, embodiments of the present invention may be applied to printers, scanners, or facsimiles supporting the Wi-Fi Direct. In addition, the Wi-Fi Direct is used as an example of the P2P communication method; however, other kinds of P2P communication such as BLUETOOTH and ZIGBEE may be used within the applicable range of the present invention.

Figure 2:
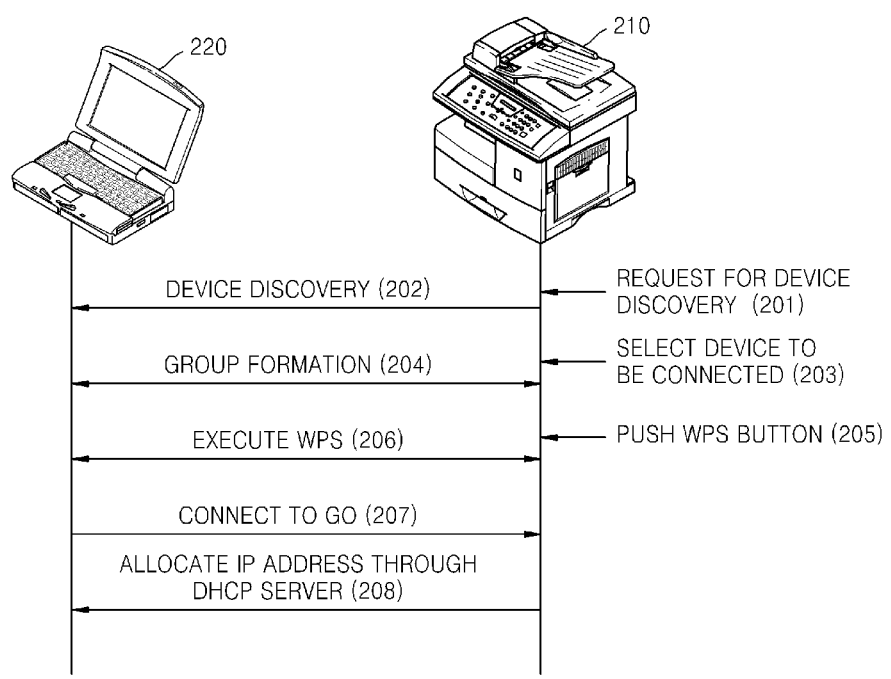
FIG. 2 is a diagram showing processes of wirelessly connecting the devices supporting the Wi-Fi Direct to each other.

FIG. 2 is a diagram showing processes of wirelessly connecting Wi-Fi Direct devices to each other. In more detail, processes of Wi-Fi Direct connection between a Wi-Fi Direct MFP 210 and a Wi-Fi Direct laptop computer 220 are shown. The Wi-Fi Direct connecting processes may be divided as a device discovery process, a group formation process, and a secure connection process. Referring to FIG. 2, the Wi-Fi Direct MFP 210 receives a request for device discovery from a user, and searches for a Wi-Fi Direct device around it (202). The device discovery request may be input through a user interface of the MFP 210, for example, a user interface realized on a display unit such as a liquid crystal display (LCD) formed in the MFP 210. If it is determined as a result of searching that there is a Wi-Fi Direct device around the MFP 210, the MFP 210 shows the user the searched device through the display unit and receives a connection request 203 from the user. The connection request 203 may also be input through the display unit of the MFP 210 from the user, for example, the user may push buttons or a touch panel of the display unit. If there are a plurality of Wi-Fi Direct devices, the MFP 210 displays a list of the searched Wi-Fi direct devices on the display unit so that the user may select one or more of the Wi-Fi direct devices and request the connection to the selected one or more Wi-Fi direct devices. The list may be displayed to the user in default manner, or according to a user setting. For example, the list may be displayed according to a type of Wi-Fi direct device, according to signal strength, according to a connection status, according to a security setting, or the list of devices may be arranged alphabetically, geographically, or by any other suitable method.

After receiving the connection request 203, a group formation is performed between the Wi-Fi Direct devices to be connected (204). The group formation process determines the Wi-Fi Direct devices to be connected to each other and determines the Wi-Fi direct devices to be the GO or the clients in the group. The Wi-Fi Direct device to be the GO is determined through the negotiation between the Wi-Fi Direct devices, and the negotiation will be described in detail with reference to FIG. 4.

When the group is formed, the devices included in the group are to be securely connected to each other by using a Wi-Fi protected setup (WPS) technology. The WPS denotes a function of performing simple secure connection between the Wi-Fi supporting devices. The WPS may be classified as a personal identification number (PIN) type WPS and a push button configuration (PBC) type WPS. The PIN type WPS sets the secure connection by inputting a PIN code that is set in advance, and the PBC type WPS sets the secure connection by pushing a WPS button that is provided on the Wi-Fi Direct device.

Hereinafter, the PBC type WPS will be described as an example. The user pushes a WPS button provided on the MFP 210 to request the secure connection (205). In addition, within a predetermined period of time (in general, about 120 seconds), the secure connection may be achieved by pushing a WPS button formed on the laptop computer 220, or a WPS button realized on an application program for Wi-Fi Direct connection in the laptop computer 220. The WPS button realized on the application program for the Wi-Fi Direct connection in the laptop computer 220 may be an object represented on a display unit of the laptop computer 220 by the application program for the Wi-Fi Direct connection. A detailed example of the WPS button is represented as reference numeral 510 in FIG. 5. The user clicks the WPS button represented on the display unit of the laptop computer 220 by using a mouse, for example, to request the secure connection. When the secure connection is requested by pushing the WPS button, the device that is determined to be the GO in the group formation process transmits security information to devices determined as the clients (206). According to Wi-Fi Direct, the secure connection is executed after encrypting in a Wi-Fi protected access 2 (WPA2)-pre-shared key (PSK) method, and thus, Wi-Fi Direct may have a higher security function than that of a conventional wired equivalent privacy (WEP) or Wi-Fi protected access (WAP) method.

When the WPS is executed, the Wi-Fi direct device that is the client is connected to the Wi-Fi direct device that is the GO (207). At this time, the Wi-Fi Direct device that is the GO automatically allocates an Internet protocol (IP) address to the Wi-Fi direct device that is the client by using a dynamic host configuration protocol (DHCP) server (208), and then, the P2P connection between the Wi-Fi Direct devices is completed.

Basic processes for connecting the Wi-Fi direct devices have been described so far, and detailed processes and characteristics of Wi-Fi Direct technology will be described with reference to the accompanying drawings as follows.

Figure 3:
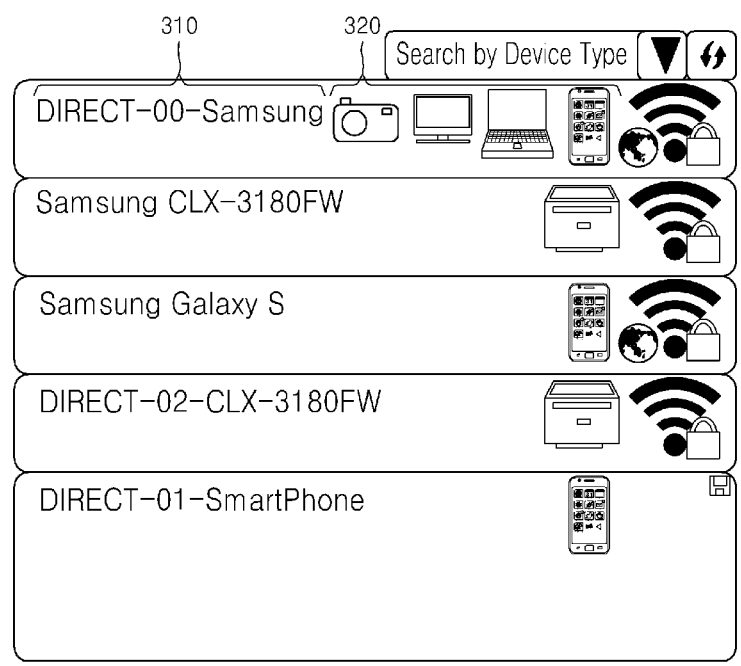
FIG. 3 is a diagram showing an example of displaying a list of Wi-Fi Direct devices that are found after a device discovery process performed by a device supporting the Wi-Fi Direct.

FIG. 3 is a diagram showing an example of displaying a list of the Wi-Fi Direct devices that are searched in the device discovery process in the Wi-Fi Direct device. When the device discovery process is performed by the Wi-Fi direct device, device information such as a type of the device and a service set identifier (SSID) of the device is exchanged between the devices through a probe request and a probe response that are WLAN packets, and the Wi-Fi direct device that performs the device discovery process displays the collected information. As shown in FIG. 3, the SSIDs and the types of the searched Wi-Fi Direct devices are represented as text or icons. Here, all of the searched devices may be represented in the list; however, the devices may be filtered so that the devices of a desired type may be only displayed in the list. According to the Wi-Fi Direct technology, the Wi-Fi direct devices are defined in category units. The Wi-Fi Direct devices may be classified as categories, for example, computers, input devices, printers, scanners, facsimiles, copying machines, and cameras, and each of the categories is divided into sub-categories. For example, the computer may be classified as personal computers (PCs), servers, laptop computers, and the like.

Figure 4:
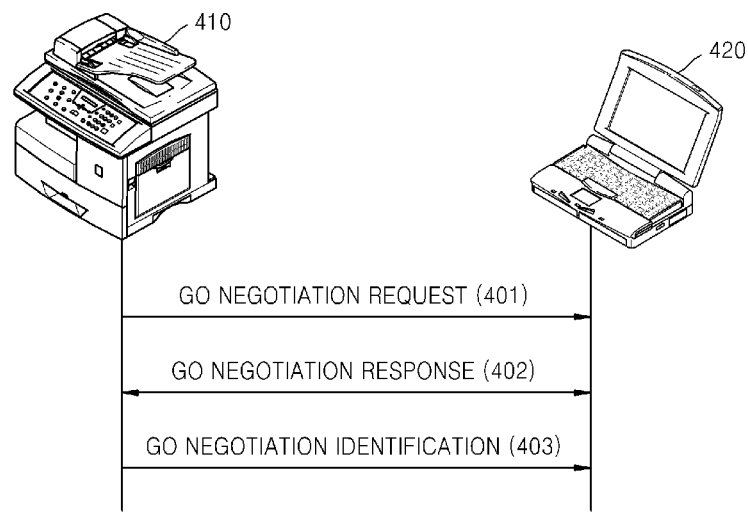
FIG. 4 is a diagram showing a group formation process in the processes of connecting the Wi-Fi Direct supporting devices to each other.

FIG. 4 is a diagram showing the group formation process in detail among the connecting processes between the Wi-Fi Direct devices. The group formation process is a process for determining the Wi-Fi Direct devices that are to form a network, and the Wi-Fi Direct devices to be the GO and the clients. For example, when the Wi-Fi direct MFP 410 performs the device discovery and selects a laptop computer 420 among the discovered Wi-Fi Direct devices to be connected, the MFP 410 transmits a GO negotiation request to the laptop computer 420 (401). The laptop computer 420 receiving the GO negotiation request compares an intent value thereof with that of the MFP 410, and then, determines the MFP 410 as the GO when the intent value of the MFP 410 is greater than that of the laptop computer 420 and determines the laptop computer 420 as the GO when the intent value of the laptop computer 420 is greater. Here, the intent value is a value representing a degree of task intent in each device, and is determined by manufacturer policy and user settings. The intent value of the device, which is supplied power always, may be set to be relatively high. As described above, after determining the Wi-Fi Direct device to be the GO by comparing the intent values, the laptop computer 420 transmits the determination result to the MFP 410 as a response to the GO negotiation (402). The MFP 410 that receives the determination result transmits an acknowledgement to the laptop computer 420 (403) in order to verify the receipt of the negotiation, and then, the group formation process is finished. When the group formation is completed, the Wi-Fi Direct device that is the GO manages security information and SSIDs of the other Wi-Fi Direct devices included in the group, i.e., the one or more clients. In this regard, it is noted that while FIG. 4 illustrates a negotiation process between two Wi-Fi Direct devices, there may be more than two Wi-Fi Direct devices which form the network. For example, the Wi-Fi direct MFP 410 may select more than one Wi-Fi Direct device and a negotiation process may be conducted between the Wi-Fi Direct devices to determine the GO in a manner similar to that discussed above by comparing respective intent values of the Wi-Fi Direct devices.

Figure 5:
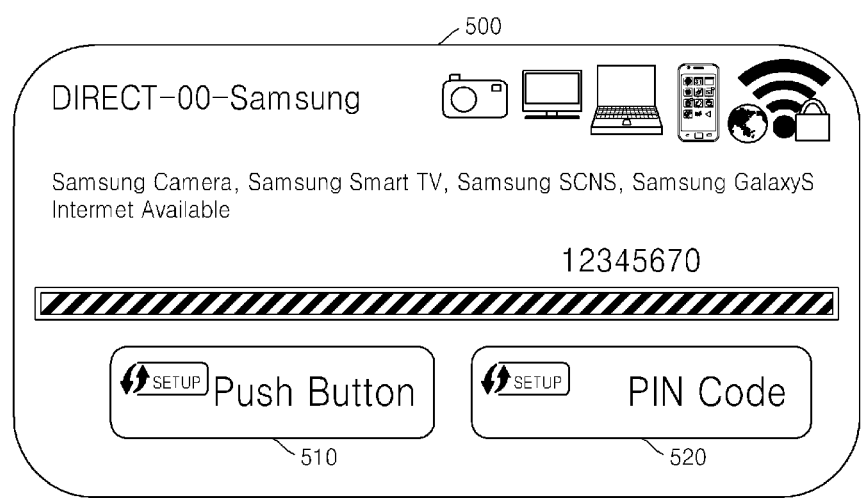
FIG. 5 is a diagram showing a display screen for executing WPS.

When the group is formed, the Wi-Fi Direct devices included in the group are securely connected to each other through the WPS. FIG. 5 is a diagram showing a display screen 500 for executing the WPS. The screen of FIG. 5 may be displayed on a display unit of the Wi-Fi Direct MFP. Referring to FIG. 5, the user may select one of a WPS button 510 and a PIN code 520 for executing the WPS. When the WPS is executed through the WPS button 510, the WPS button 510 of the Wi-Fi Direct MFP is pushed and WPS buttons of other devices are pushed within a predetermined period of time, and then, security information is exchanged between the devices automatically and the secure connection is made. Here, the Wi-Fi Direct device that is the GO provides security information to the Wi-Fi direct devices that are the clients. In addition, the secure connection is performed after encrypting in the WPA2-PSK verification method, and thus, high security may be achieved.

Figure 6:
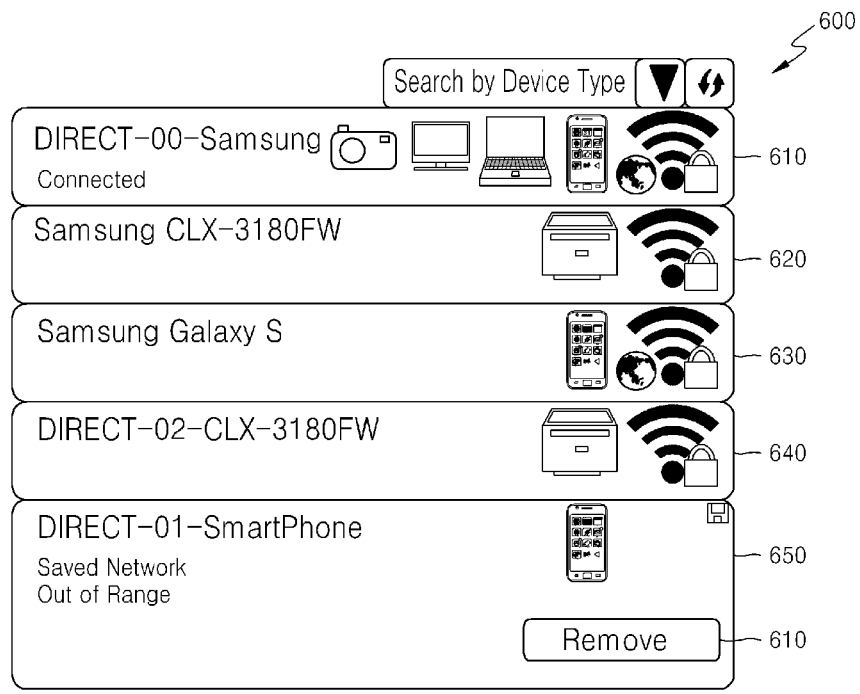
FIG. 6 is a diagram showing a list of devices supporting Wi-Fi Direct, information of which is stored according to a profile storing function.

The Wi-Fi Direct devices have a profile storage function that is used to store information of the Wi-Fi Direct devices connected thereto. FIG. 6 is a diagram showing a list of the Wi-Fi Direct devices, information of which is stored according to the profile storage function. The list of FIG. 6 is a screen displayed on the display unit of the Wi-Fi Direct MFP. Information of a first list 610 denotes a Wi-Fi Direct device currently connected to the Wi-Fi Direct MFP, information of second through fourth lists 620-640 denotes Wi-Fi Direct devices that are not currently connected to the Wi-Fi Direct MFP, but are included in a device discovery range of the Wi-Fi Direct MFP, and information of a fifth list 650 denotes a Wi-Fi Direct device that has been connected at least once to the Wi-Fi Direct device although that is not discovered currently. If the information of the fifth list 650 is not necessary, the user may delete the fifth list 650 by pushing a remove button 651. Since the Wi-Fi direct device has the profile storage function as described above, the Wi-Fi Direct device may store information of the other Wi-Fi Direct devices connected at least once thereto, and then, may be connected more quickly without executing the WPS by using the stored information in a case where the same device tries to connect to the Wi-Fi Direct device again.

Figure 7:
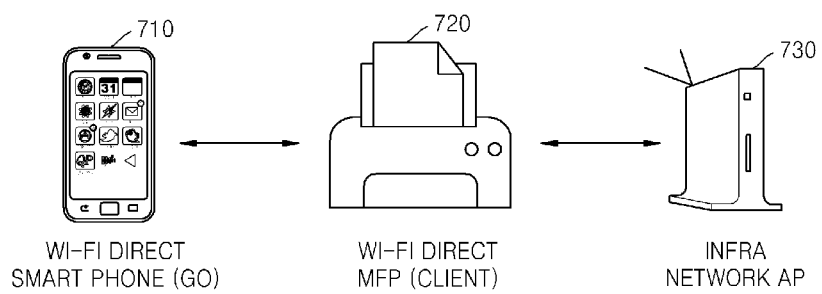
FIG. 7 is a diagram showing Wi-Fi Direct supporting devices that are simultaneously connected to each other.

The Wi-Fi Direct device may be P2P connected to another Wi-Fi direct device, and at the same time, may be connected to the infrastructured network, which is referred to as a concurrent connection. FIG. 7 is a diagram showing the Wi-Fi Direct devices that are in the concurrent connection states. Referring to FIG. 7, the Wi-Fi direct MFP 720 is P2P connected to a smartphone 710 that is another Wi-Fi direct device, and at the same time, the Wi-Fi Direct MFP 720 is also connected to an AP 730 of the infrastructured network. The Wi-Fi Direct MFP 720 may directly transmit/receive print data to/from the smartphone 710, and at the same time, may directly transmit/receive print data to/from the infrastructured network through the AP 730 of the infrastructured network.

When the Wi-Fi direct device is concurrently connected to the Wi-Fi Direct device and the infrastructured network as shown in FIG. 7, or when the Wi-Fi Direct device is connected to the infrastructured network (for example, by a wired connection), and P2P connected to another Wi-Fi direct device, different IP addresses and MAC addresses with respect to the connections may be used. That is, a different connection to the infrastructured network may be used from the connection to the another Wi-Fi Direct device. Through a multi-homing technology, the Wi-Fi Direct device may provide the devices with different services from each other. For example, the Wi-Fi Direct MFP may provide services of all functions of the MFP through an interface connected to the infrastructured network; however, the Wi-Fi Direct MFP may provide services of partial functions of the MFP through an interface connected to another Wi-Fi Direct device.

Figure 8:
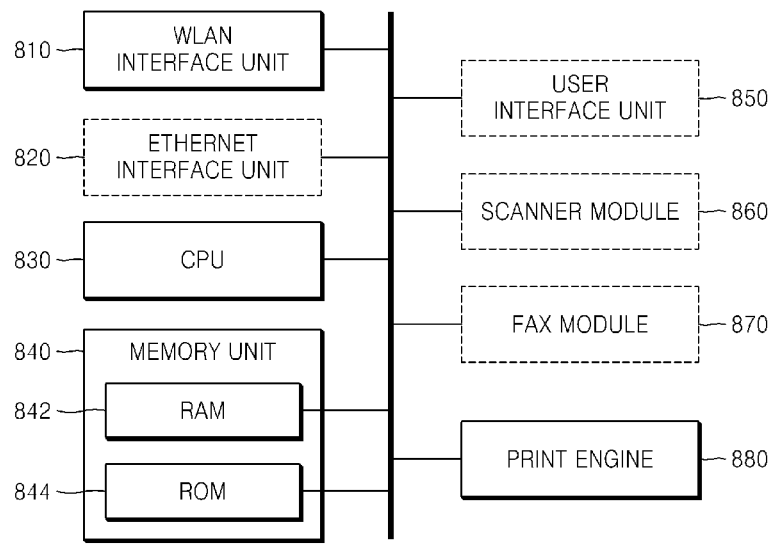
FIG. 8 is a block diagram showing a hardware configuration of a multi-function printer supporting the Wi-Fi Direct according to an embodiment of the present invention.

FIG. 8 is a block diagram showing a hardware configuration of the Wi-Fi Direct MFP. Referring to FIG. 8, the Wi-Fi Direct MFP may include a WLAN interface unit 810, an Ethernet interface unit 820, a central processing unit (CPU) 830, a memory unit 840, a user interface unit 850, a scanner module 860, a fax module 870, and a print engine 880. In addition, the memory unit 840 may include a random access memory (RAM) 842 and a read only memory (ROM) 844. If the MFP only supports the WLAN, the MFP may not include the Ethernet interface unit 820. In addition, if the device is a printer which does not perform scanning or faxing functions like an MFP, the scanner module 860 and the fax module 870 may not be necessary.

The WLAN interface unit 810 includes hardware performing IEEE 802.11b/g/n function, and may communicate with a main board, on which the CPU 830 is mounted, of the MFP via a universal serial bus (USB). The Ethernet interface unit 820 includes hardware for performing wired Ethernet communication according to IEEE 802.3. The CPU 830 controls overall operations of the MFP, and the memory unit 840 stores information for controlling the MFP and the print data to be read when it is necessary. The user interface unit 850 functions as a medium for the user to identify information of the MFP and to input commands into the MFP. The user interface unit 850 may be variously modified. For example, the user interface unit may be configured as two or four lines displayed on a display unit such as an LCD or a light emitting diode (LED), or may be realized as a graphic user interface (UI) so as to represent various graphics. The scanner module 860, the fax module 870, and the print engine 880 include hardware for performing functions of a scanner, a facsimile, and a printer.

Figure 9:
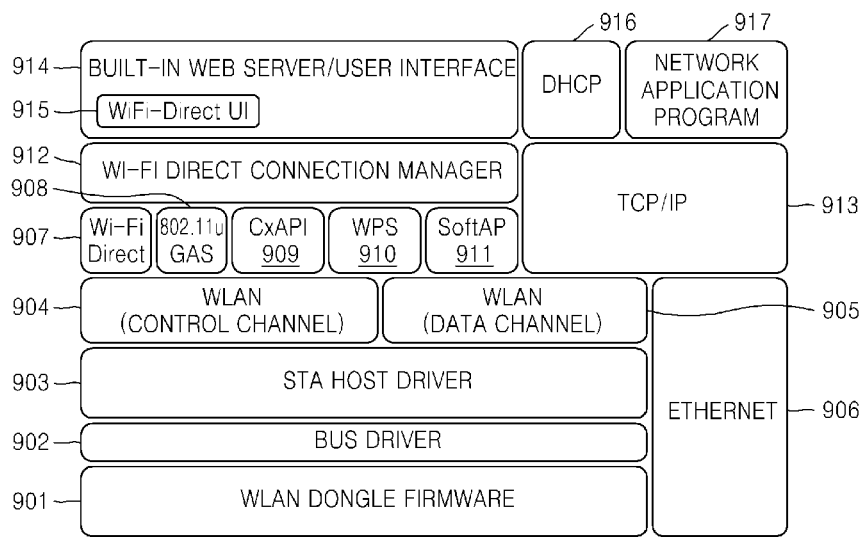
FIG. 9 is a block diagram showing a software configuration of the multi-function printer supporting the Wi-Fi Direct of FIG. 8.

FIG. 9 is a block diagram showing software configuration of the Wi-Fi Direct MFP. The configuration of the software in the Wi-Fi Direct MFP will be described with reference to FIG. 9 as follows.

A WLAN dongle firmware 901 includes firmware for connecting the WLAN, and may be stored in WLAN dongle hardware or may be transmitted to the WLAN dongle hardware from a main board of the MFP when booting the MFP. A bus driver 902 and a station (STA) host driver 903 are low level bus drivers for communicating with the WLAN hardware. A WLAN control channel 904 and a WLAN data channel 905 are channels for communicating with the WLAN firmware. A Wi-Fi Direct module 907 performs the Wi-Fi Direct connection and transmits an operating command to the WLAN firmware. An IEEE 802.11u generic advertisement service (GAS) module 908 performs functions according to IEEE 802.11u GAS, and a WPS module 910 performs a WPS function. An application programming interface (CxAPI) module 909 may be used by application developers to create, modify, or delete applications used by Wi-Fi Direct devices. A soft AP module 911 is a software module allowing the MFP to perform as the AP. A transmission control protocol (TCP)/IP 913 is a standard protocol for network transmission. A Wi-Fi Direct connection manager 912 is a module for controlling the Wi-Fi Direct connection. A Wi-Fi Direct user interface 915 allows the user to perform settings related to the Wi-Fi Direct, and may be included in a user interface 914 that is installed in an embedded web server (EWS). A DHCP server 916 automatically allocates an IP address to a Wi-Fi Direct device that is connected as a client. A network application program 917 performs various application operations relating to the network.

The above-described Wi-Fi Direct technology has the following advantages.

The Wi-Fi Direct device may be connected to other devices whenever and wherever, and thus, has maximum mobility and portability. If a new Wi-Fi Direct device is added, the Wi-Fi Direct device may be directly connected to the new Wi-Fi direct device. In addition, the Wi-Fi Direct device may identify whether there is an available device or service before setting the connection to other devices, and thus, the Wi-Fi direct devices may be conveniently used. In addition, the connection may be performed simply and stably by a simple operation, for example, pushing a WPS button, and the connection may be performed with high security functions by using the WPA2 technology.

In addition, Wi-Fi Direct technology may provide various functions that may not be provided by conventional WLAN technology.

For example, the device discovery function for searching for peripheral Wi-Fi Direct devices by the device type unit, the service discovery function that may search for services provided by the peripheral Wi-Fi Direct devices, a power management function that may effectively use electric power, the concurrent connection function that may form the P2P connection between the Wi-Fi Direct devices while connecting to the conventional infrastructured network, a function of separating a security domain between the network connection and the Wi-Fi Direct connection, and a cross connection function for sharing an Internet connection, may be provided by Wi-Fi Direct technology.

In addition, since Wi-Fi Direct technology is based on conventional WLAN technology, that is, IEEE 802.11, the Wi-Fi Direct devices may be compatible with conventional legacy WLAN devices.

Hereinafter, the MFP supporting Wi-Fi Direct and a method of executing an application program through an IP address linkage in the MFP according to an embodiment of the present invention will be described with reference to FIGS. 10 through 17.

The MFP may transfer a scanned image to a server by using an application program having a scan-to-server function such as a scan to server message block (SMB), a scan to file transfer protocol (FTP), and a scan to web-based distributed authoring and versioning (WebDAV). In order to execute the application program as above, an internet protocol (IP) address of the server is necessary. Therefore, a user of the MFP sets and stores the IP address of the wireless device, to which the image is to be transferred, in the application program with device information such as a MAC address of the wireless device, the device type, the manufacturer, and the device title such that the stored IP address may be used when executing the application program. The pre-set and stored IP address is set in advance in the application program and is maintained at the initially set value unless the user resets the value, and thus the pre-set and stored IP address may be referred to as a static IP address. On the other hand, an IP address allocated by the MFP supporting Wi-Fi Direct using the DHCP server may be changed whenever a wireless connection is made, and thus may be referred to as a dynamic IP address.

When the application program using the IP address such as the scan-to-server is executed, the static IP address that is preset and stored by the user is used. Whenever the wireless device is connected to the MFP, an dynamic IP address is allocated and may be different from the static IP address that is stored in advance, and thus the application program may not be performed with an accurate IP address. Therefore, according to the present embodiment, even if the new dynamic IP address is allocated whenever the wireless connection is made, the allocated dynamic IP address is linked with the static IP address that is stored in advance, and thus, the application program may be performed with an accurate IP address.

Figures 10, 11:
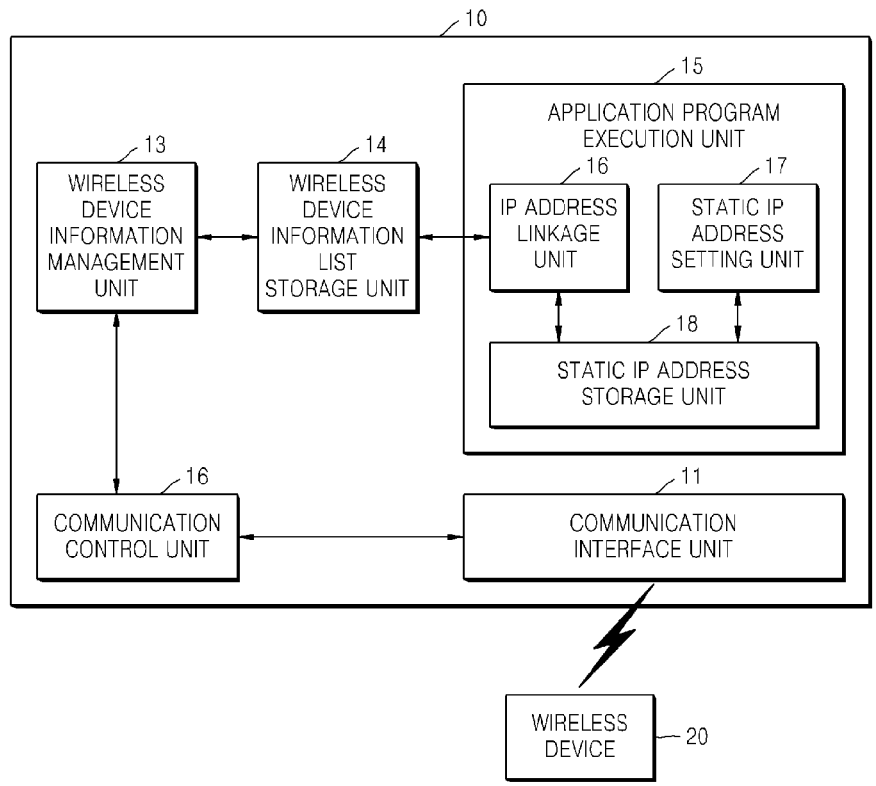
FIG. 10 is a block diagram of a detailed hardware configuration of the multi-function printer supporting the Wi-Fi Direct, shown in FIG. 8.
FIG. 11 is a diagram showing an example of a list of wireless device information stored in the multi-function printer supporting the Wi-Fi Direct according to the embodiment of the present invention.

FIG. 10 is a block diagram of a Wi-Fi Direct MFP 10 according to an embodiment of the present invention. Featured components, which may be necessary in executing the method of executing the application program through the IP address linkage, of the Wi-Fi Direct MFP 10 are shown in FIG. 10 under the assumption that the basic hardware configuration of the Wi-Fi Direct MFP shown in FIG. 8 is included in the Wi-Fi Direct MFP 10. For example, a communication interface unit 11 of FIG. 10 corresponds to the WLAN interface unit 810 of FIG. 8, and a communication control unit 12 corresponds to a part for controlling communications in the CPU 830 of FIG. 8. A wireless device information management unit 13 of FIG. 10 corresponds to a portion performing management processes of the wireless device information in the CPU 830 of FIG. 8, a wireless device information list storage unit 14 of FIG. 10 corresponds to a space where the wireless device information list is stored in the memory unit 840 of FIG. 8, and an application program execution unit 15 of FIG. 10 corresponds to a portion handling the execution of the application program in the CPU 830 of FIG. 8. Basic components of the MFP such as the print engine 880, the fax module 870, and the scanner module 860 shown in FIG. 8 are not shown in FIG. 10.

Referring to FIG. 10, the MFP 10 supporting the Wi-Fi Direct according to the present embodiment includes the communication interface unit 11, the communication controller 12, the wireless device information management unit 13, the wireless device information list storage unit 14, and the application program execution unit 15. The application program execution unit 15 may include an IP address linkage unit 16, a static IP address setting unit 17, and a static IP address storage unit 18 as shown in FIG. 10. In addition, although not shown in FIG. 10, the MFP 10 supporting the Wi-Fi Direct may further include a soft AP unit for allowing the MFP 10 to function as an AP, and a DHCP server for allocating an IP address to the wireless device connecting to the MFP 10. In addition, the MFP 10 may be P2P connected to an external wireless device 20 through the communication interface unit 11. Functions of the components in the MFP 10 will be described with reference to following flowcharts.

Figure 12:
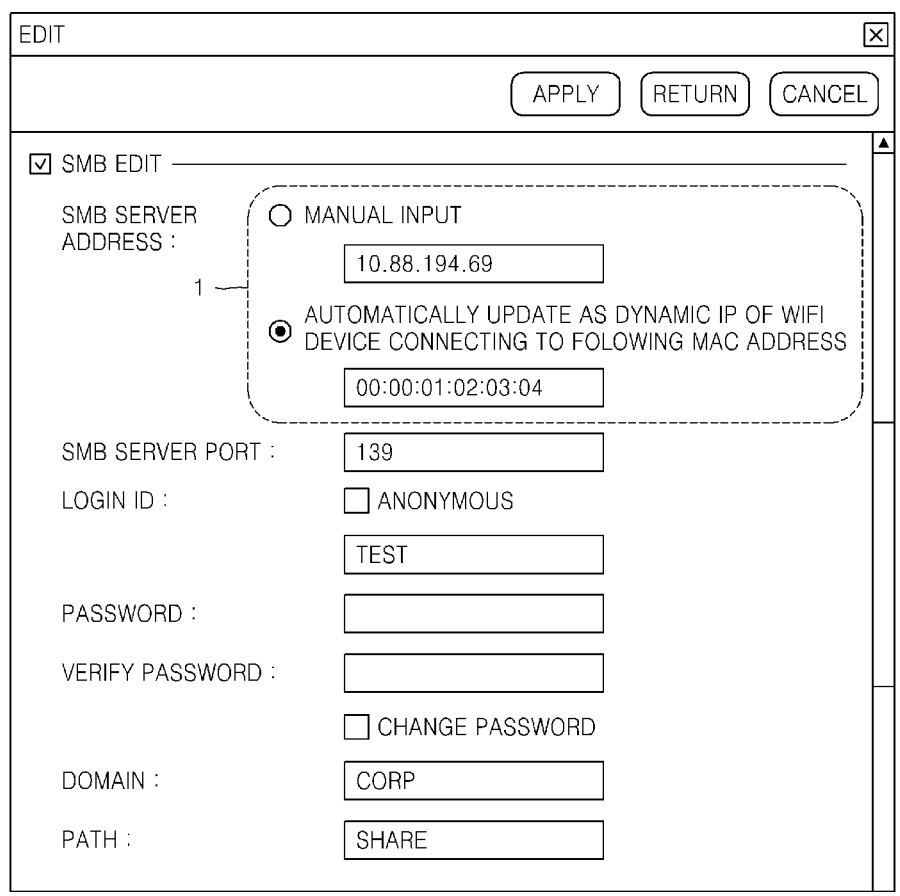
FIG. 12 is a diagram showing a screen for setting a linkage of an Internet protocol (IP) address in the multi-function printer supporting the Wi-Fi Direct according to the embodiment of the present invention.

FIG. 11 is a diagram showing an example of a wireless device information list stored in the MFP supporting the Wi-Fi Direct according to an embodiment of the present invention, FIG. 12 is a diagram showing a screen for setting a linkage of an IP address in the MFP supporting Wi-Fi Direct according to the embodiment of the present invention, and FIG. 13 is a diagram showing a screen for setting an IP limitation function in the MFP supporting the Wi-Fi Direct according to the embodiment of the present invention. FIGS. 11 through 13 will be described with reference to flowcharts shown in FIGS. 14 through 17.

FIGS. 14 through 17 are flowcharts illustrating the method of executing the application program through the IP address linkage in the MFP supporting Wi-Fi Direct according to the embodiments of the present invention. The method of executing the application program in the MFP according to the embodiments of the present invention will be described with reference to FIGS. 14 through 17. In operation S1401, the MFP 10 is connected to the external wireless device 20 through the communication interface unit 11 in a P2P connection method. When both of the MFP 10 and the wireless device 20 support BLUETOOTH technology, the MFP 10 and the wireless device 20 may be P2P connected to each other by using BLUETOOTH technology. Otherwise, when the MFP 10 and the wireless device 20 support Wi-Fi Direct, one of the MFP 10 and the wireless device 20 becomes a GO and drives a soft AP (not shown) to function as an AP such that the MFP 10 and the wireless device 20 may be P2P connected to each other. An example where both of the MFP 10 and the wireless device 20 support Wi-Fi Direct and the MFP 10 becomes the GO will be described as follows. The MFP 10 and the wireless device 20 are P2P connected to each other through the connection processes shown in FIG. 2. That is, when the MFP 10 searches for peripheral wireless devices, the MFP 10 selects a wireless device 20 to be connected among the found wireless devices, and sends a connection request. The MFP 10 may function as the GO through the group formation processes shown in FIG. 4. In addition, when the WPS button disposed on the wireless device 20 is pushed, the MFP 10 and the wireless device 20 are securely connected to each other.

Then, in operation S1403, the communication controller 12 of the MFP 10 drives the DHCP server (not shown) to allocate a dynamic IP address to the connected wireless device 20. Here, the dynamic IP address allocated to the wireless device 20 by the DHCP server may vary at every wireless connection, and thus the dynamic IP address may be different from the static IP address that is preset with respect to the wireless device 20 in the application program such as the scan-to-server application program.

In operation S1405, the wireless device information management unit 13 of the MFP 10 stores the dynamic IP address and a MAC address allocated to the connected wireless device 20 in a wireless device information list, and the wireless device information list is stored in the wireless device information list storage unit 14. An example of the wireless device information list according to the embodiment of the present invention is shown in FIG. 11. Referring to FIG. 11, device information of each wireless device such as whether the wireless device supports Wi-Fi Direct, the device type, the manufacturer, the device title, the MAC address, and the dynamic IP address is stored in the wireless device information list. Other pieces of device information stored with the dynamic IP address in the wireless device information list may be used to extract the dynamic IP address corresponding to the preset static IP address from the wireless device information list.

In operation S1407, the dynamic IP address allocated to the wireless device is linked with the static IP address that is preset with respect to the wireless device in the application program by using the device information stored in the wireless device information list. As described above, the dynamic IP address allocated when the wireless connection is made is linked with the static IP address that is stored in advance by using the wireless device information list, and thus an accurate IP address, that is, the allocated IP address, may be used when executing the application program.

Figure 14:
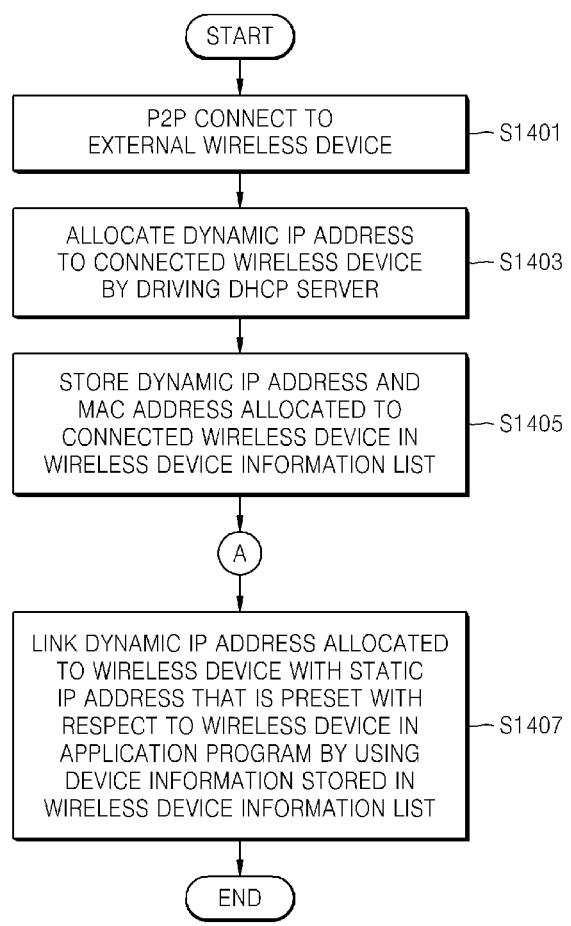
FIGS. 14 through 17 are flowcharts illustrating a method of executing an application program through an IP address linkage in a multi-function printer supporting the Wi-Fi Direct according to embodiments of the present invention.
Figure 15:
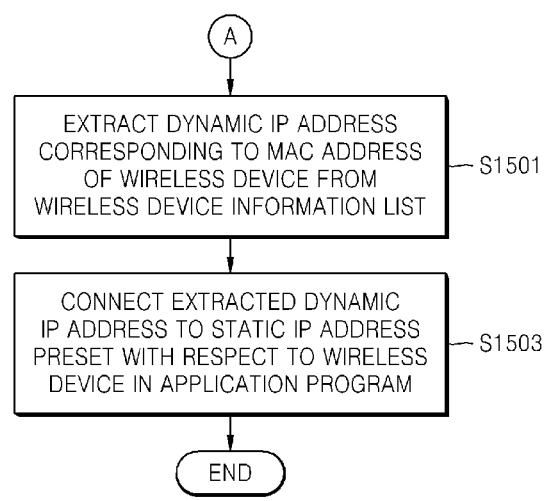

FIG. 15 is a flowchart illustrating a detailed example of the operation S1407 shown in FIG. 14, that is, a process of linking the dynamic IP address with the static IP address. In operation S1501, a dynamic IP address corresponding to the MAC address of the wireless device is detected from the wireless device information list. As described above, the user stores the device information such as the static IP address, the MAC address, the device type, the manufacturer, and the device title of the wireless device in the application program, and thus, the corresponding wireless device may be found by using the device information and the dynamic IP address allocated to the wireless device may be extracted. In particular, the MAC address is unique information belonging to each of the wireless devices, and thus, the dynamic IP address corresponding to the MAC address of the wireless device stored in the application program may be extracted.

In operation S1503, when the dynamic IP address is extracted from the wireless device information list, the extracted dynamic IP address is linked with the static IP address that is preset. FIG. 12 shows a screen for setting the IP address linkage. In FIG. 12, the IP address may be manually input or may be automatically connected to the dynamic IP address corresponding to the stored MAC address by setting options of an SMB server address 1.

On the other hand, the present invention may be applied to an application program having an IP restriction function, as well as the application program for transmitting the scanned image such as the scan-to-server. For example, the dynamic IP address stored in the wireless device information list is automatically added to service restriction objects, and the dynamic IP address deleted from the wireless device information list is automatically deleted from the service restriction objects such that the wireless devices, to which the dynamic IP addresses are allocated, may use a restricted range of services. FIG. 13 shows a setting screen for linking the IP addresses with the application program having the IP restriction function.

Figure 16:
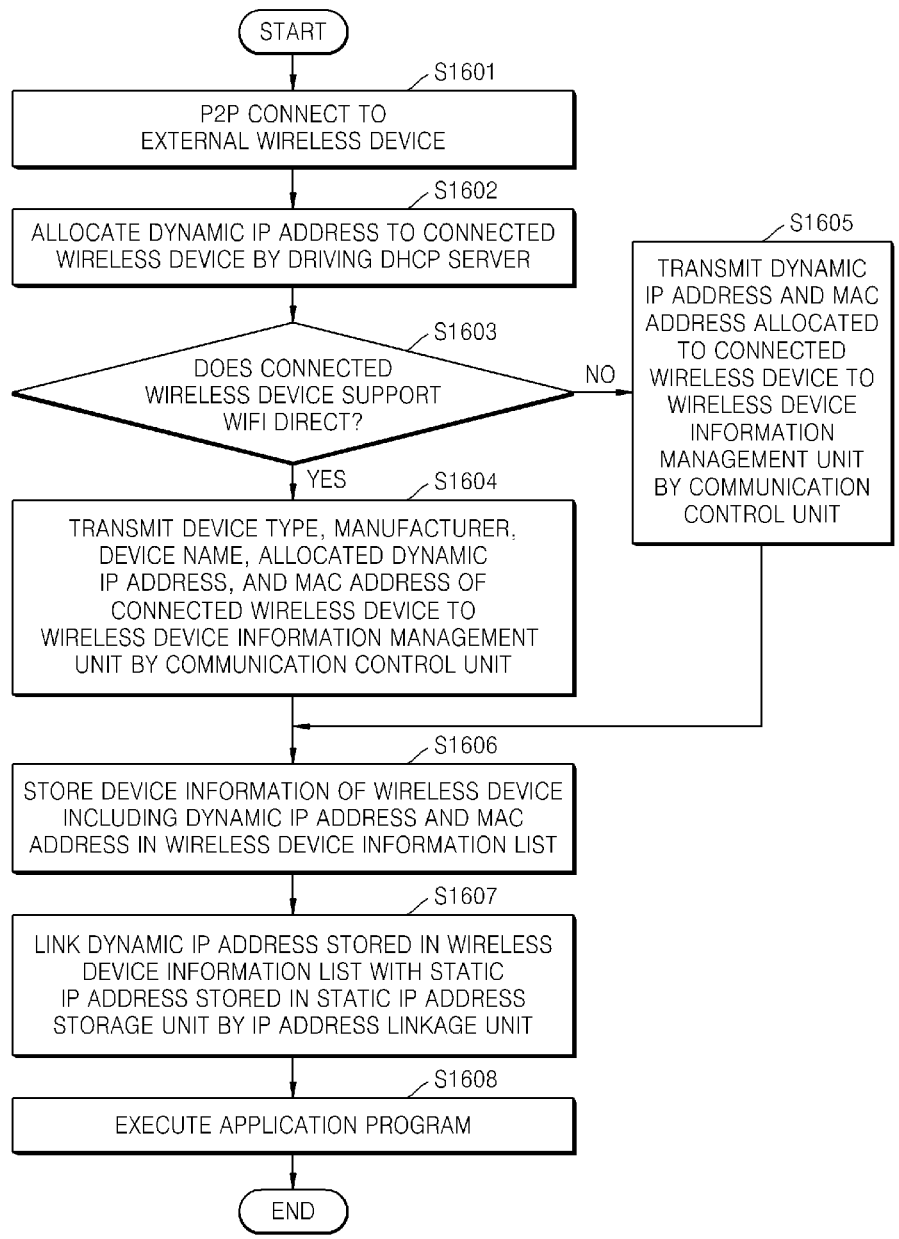

FIG. 16 is a flowchart illustrating a method of executing an application program in an MFP supporting Wi-Fi Direct according to another embodiment of the present invention. A wireless device that is P2P connected to the MFP supporting Wi-Fi Direct may be a device supporting Wi-Fi Direct, or may be a legacy type WLAN device that does not support Wi-Fi Direct. FIG. 16 shows that different operations are performed by the MFP according to whether the wireless device connecting to the MFP supports Wi-Fi Direct or not. For example, based upon the determination of whether the wireless device connecting to the MFP supports Wi-Fi Direct different device information may be stored in the wireless device information management unit of the MFP.

In operation S1601, when the wireless device 20 is P2P connected to the MFP 10, the communication controller 12 drives the DHCP server to allocate an IP address to the wireless device 20 in operation S1602. In operation S1603, it is determined whether the wireless device 20 supports Wi-Fi Direct. When the wireless device 20 supports Wi-Fi Direct, the communication controller 12 of the MFP 10 may acquire device information such as the device type, the manufacturer, the device title, etc. of the wireless device 20 through the device searching operation shown in FIG. 3. Thus, in operation S1604, the communication controller 12 transfers the dynamic IP address allocated to the wireless device 20, the MAC address, the device type, the manufacturer, and the device title to the wireless device information management unit 13. On the other hand, when it is determined that the wireless device 20 does not support the Wi-Fi Direct in operation S1603, the communication controller 12 only acquires the dynamic IP address and the MAC address except for the device type, the manufacturer, and the device title, and thus, transfers the dynamic IP address and the MAC address to the wireless device information management unit 13. Accordingly, the MFP 10 may selectively obtain device information based on the determination of whether the wireless device 20 is Wi-Fi Direct capable, and unnecessary information need not be obtained and/or stored.

In operation S1606, the wireless device information management unit 13 stores the device information of the wireless device transferred from the communication controller 13, where the device information includes the dynamic IP address and the MAC address, in the wireless device information list. In operation S1607, the IP address linkage unit 16 links the dynamic IP address allocated to the wireless device with the static IP address by using the wireless device information list, and after that, the application program is executed in operation S1608 such that the application program may be executed with the accurate IP address.

Figure 17:
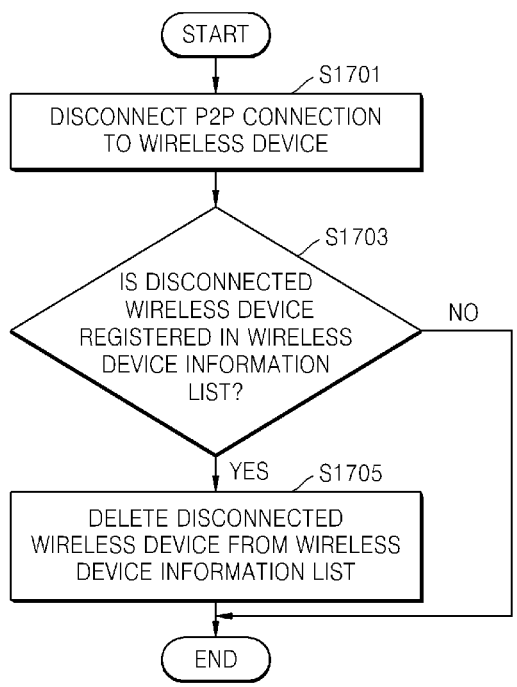

FIG. 17 is a flowchart illustrating processes of deleting device information of the wireless device, the connection of which is disconnected, when the MFP and the wireless device are disconnected, in the method of executing the application program through the IP address linkage in the MFP supporting Wi-Fi Direct. Referring to FIG. 17, in operation S1701, when the P2P connection between the MFP 10 and the wireless device 20 is disconnected, it is identified whether the device information of the disconnected wireless device is stored in the wireless device information list in operation S1703. When the device information of the disconnected wireless device 20 is stored, the device information of the disconnected wireless device is deleted from the wireless device information list in operation S1705.

According to the present invention, the application program is executed after linking the dynamic IP address allocated to the wireless device, which is P2P connected to the MFP, with the static IP address that is preset with respect to the wireless device, and thus, the application program may be executed by using the changed IP address even if the dynamic IP address is changed whenever the P2P connection is made.

The image forming apparatus supporting a peer-to-peer connection and method of executing an application program thereof according to the above-described example embodiments may use one or more processors, which may include a microprocessor, central processing unit (CPU), digital signal processor (DSP), or application-specific integrated circuit (ASIC), as well as portions or combinations of these and other processing devices. For example, the WI-FI Direct devices, WI-FI devices, and access point devices disclosed herein may include one or more processors, and the methods disclosed herein which may be performed by the WI-FI Direct devices, WI-FI devices, and access point devices, may be executed using one or more processors. In addition, operations executed by software modules or software units which are disclosed herein, may be executed using one or more processors. For example, one of ordinary skill in the art would understand that operations executed by software components illustrated in FIG. 9 (e.g., soft AP module 911), may be executed using one or more processors to perform their respective functions.

The terms "module", and "unit," as used herein, may refer to, but is not limited to, a software or hardware component, circuit, or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The methods of executing an application program through an internet protocol address linkage in an image forming apparatus supporting a peer-to-peer connection, as disclosed herein, may be embodied as computer readable code recorded in a non-transitory computer readable medium, including program instructions to implement various operations embodied by a computer. The media may also include, alone or in combination with the program instructions, data files, data structures, and the like. Here, the non-transitory computer readable medium may be any recording apparatus capable of storing data that is read by a computer system, e.g., a read-only memory (ROM), a random access memory (RAM), a hard disk, a compact disc (CD)-ROM, a digital versatile disc (DVD), a magnetic tape, a floppy disk, an optical data storage device, flash memory, and so on. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. The computer readable medium can be distributed among computer systems that are interconnected through a network, and the present invention may be stored and implemented as computer readable code in the distributed system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of executing an application program through an internet protocol (IP) address linkage in an image forming apparatus supporting a peer-to-peer (P2P) connection, the method comprising:
   P2P connecting the image forming apparatus to a wireless device through a wireless local area network (WLAN);
   driving a soft access point (AP) module of the image forming apparatus so that the image forming apparatus functions as an AP;
   driving a dynamic host configuration protocol (DHCP) server of the image forming apparatus to allocate a dynamic IP address to the connected wireless device;
   storing device information of the wireless device including the dynamic IP address allocated to the wireless device and a media access control (MAC) address of the wireless device; linking the dynamic IP address allocated to the wireless device with a static IP address that is preset with respect to the wireless device in the application program by using the stored device information; and
   executing the application program.

2. The method of claim 1, wherein the image forming apparatus functions as the AP to allow clients on a WLAN to be connected to each other or functions as a client on the WLAN, and
   the allocating of the dynamic IP address is performed when the image forming apparatus functions as the AP.

3. The method of claim 1, wherein the linking the dynamic IP address with the static IP address preset with respect to the wireless device comprises extracting the dynamic IP address corresponding to the MAC address of the wireless device and linking the extracted dynamic IP address with the static IP address.

4. The method of claim 1, wherein the device information comprises one or more selected from a device type, a manufacturer, a device name, and a host name of the wireless device.

5. The method of claim 1, further comprising:
determining whether the connection to the wireless device is maintained; and
when it is determined that the connection to the wireless device is disconnected, deleting the device information of the disconnected wireless device.

6. The method of claim 1, further comprising:
scanning a network port of the wireless device;
determining a protocol supported by the wireless device as a result of the scanning; and
activating the protocol supported by the wireless device.

7. A non-transitory computer readable recording medium having embodied thereon a computer program for executing the method according to claim 1.

8. An image forming apparatus supporting a peer-to-peer (P2P) connection, the image forming apparatus comprising:
a communication interface unit to connect to a wireless device in a P2P connection method when the image forming apparatus operates as an access point (AP); a communication control unit to allocate a dynamic internet protocol (IP) address to the P2P connected wireless device; a wireless device information management unit to store device information of the wireless device including the dynamic IP address allocated to the wireless device and a media access control (MAC) address of the wireless device; and
an application program execution unit to link the dynamic IP address allocated to the wireless device with a static IP address that is preset with respect to the wireless device in an application program by using the stored device information, and to execute the application program.

9. The image forming apparatus of claim 8, wherein the image forming apparatus functions as the AP to allow clients on a WLAN to be connected to each other or functions as a client on the WLAN, and the communication control unit allocates the dynamic IP address to the connected wireless device when the image forming apparatus functions as the AP.

10. The image forming apparatus of claim 8, wherein the application program execution unit comprises:
a static IP address setting unit to set a static IP address with respect to the wireless device;
a static IP address storage unit to store the static IP address; and
an IP address linkage unit to link the dynamic IP address allocated to the wireless device with the static IP address by using the stored device information.

11. The image forming apparatus of claim 8, further comprising:
a wireless device information list storage unit to store a wireless device information list which includes device information received by the communication control unit.

12. The image forming apparatus of claim 11, wherein the IP address linkage unit extracts the dynamic IP address corresponding to the MAC address of the wireless device from the wireless device information list, and links the dynamic IP address with the static IP address.

13. The image forming apparatus of claim 8, wherein device information received by the communication control unit comprises one or more of a device type, a manufacturer, a device name, and a host name of the wireless device.

14. The image forming apparatus of claim 8, wherein when the connection of the wireless device is disconnected, the communication control unit notifies the wireless device information management unit of the disconnection and the device information of the disconnected device is deleted.

15. The image forming apparatus of claim 8, wherein the communication control unit scans a network port of the wireless device to search for a protocol supported by the wireless device, and activates the searched protocol.

16. An image forming apparatus supporting a peer-to-peer (P2P) connection, the image forming apparatus comprising:
a communication interface unit to perform a P2P connection to a wireless device;
a communication control unit to allocate a dynamic internet protocol (IP) address to the wireless device and to determine whether the wireless device supports a predetermined wireless communication type,
wherein the communication control unit selectively obtains device information of the wireless device depending on whether the wireless device supports the predetermined wireless communication type;
a storage unit to store the obtained device information of the wireless device; and
an application program execution unit to link the dynamic IP address allocated to the wireless device with a static IP address that is preset with respect to the wireless device in an application program by using the stored device information, and to execute the application program.

17. The image forming apparatus of claim 16, wherein the image forming apparatus operates as an access point (AP) after performing a negotiation process between the image forming apparatus and the wireless device during connection of the wireless device to the image forming apparatus.

18. The image forming apparatus of claim 17, wherein the image forming apparatus is determined to be an access point by comparing an intent value of the image forming apparatus with an intent value of the wireless device.

19. The image forming apparatus of claim 16, wherein the predetermined wireless communication type includes Wi-Fi Direct.

20. The image forming apparatus of claim 16, wherein the stored device information includes at least the dynamic IP address allocated to the wireless device and a media access control (MAC) address of the wireless device.

21. The image forming apparatus of claim 16, wherein the application program execution unit includes an IP restriction function, to automatically restrict the wireless device allocated the dynamic IP address to a range of services.

* * * * *